(12) United States Patent
Happonen

(10) Patent No.: US 7,194,615 B2
(45) Date of Patent: Mar. 20, 2007

(54) RECONFIGURABLE APPARATUS BEING CONFIGURABLE TO OPERATE IN A LOGARITHMIC SCALE

(75) Inventor: Aki Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 10/244,614

(22) Filed: Sep. 17, 2002

(65) Prior Publication Data

US 2004/0054708 A1   Mar. 18, 2004

(51) Int. Cl.
    G06F 9/00      (2006.01)
    G06F 7/24      (2006.01)
(52) U.S. Cl. .................. 713/100; 713/1; 708/851
(58) Field of Classification Search ............ 713/1, 713/100; 716/16, 17; 708/512, 517, 851; 712/10, 15; 326/37, 41
    See application file for complete search history.

(56) References Cited

U.S. PATENT DOCUMENTS

| 4,720,809 | A | * | 1/1988 | Taylor ................. 708/512 |
| 5,583,450 | A | * | 12/1996 | Trimberger et al. .......... 326/41 |
| 5,946,219 | A | * | 8/1999 | Mason et al. ............. 716/16 |
| 5,961,579 | A | * | 10/1999 | Pan et al. .............. 708/517 |
| 6,150,838 | A | * | 11/2000 | Wittig et al. ............ 326/39 |
| 6,219,785 | B1 | * | 4/2001 | Smith ................. 713/1 |
| 6,381,733 | B1 | * | 4/2002 | Curtin ................ 716/17 |
| 6,603,394 | B2 | * | 8/2003 | Raichle et al. ........... 340/438 |
| 6,658,564 | B1 | * | 12/2003 | Smith et al. ............. 713/100 |

OTHER PUBLICATIONS

Circuits & Devices; Considering the Alternatives in LowPower Design; Jul. 2001; pp. 23-29.
Peter Soderquist, et al.; Division and Sqare Root Choosing The Right Inplementation ; Jul./Aug. 1997; pp. 56-66.
Po-Chih Tseng, et al.; CDSP: An Application-Specific Digital Signal Processor For Third Generation Wireless Communications; pp. 200-201.
V. Tchoumatchenko, et al. ; A FPGA Based Square-Root Coprocessor ; pp. 520-525.
V. Pallouras, et al.; Low-power Properties of the Logarithmic Number System; pp. 229-236.
Samuel L. SanGregory, et al.; A Fast, Low-Power LogarithmApproximation with CMOS VLSI Implementation ; pp. 388-391.

* cited by examiner

Primary Examiner—Thomas Lee
Assistant Examiner—Mark Connolly
(74) Attorney, Agent, or Firm—Robert M. Bauer; Lackenbach Siegel, LLP

(57) ABSTRACT

An integrated circuit has a command/control bus and a number of processing elements. The processing elements contain a number of parts, each part being connected to said command/control bus. Each one of the processing elements is re-configurable in response to commands on said command/control bus to provide any one of a plurality of different arithmetic operations.

22 Claims, 2 Drawing Sheets

RECONFIGURABLE APPARATUS BEING CONFIGURABLE TO OPERATE IN A LOGARITHMIC SCALE

BACKGROUND OF THE INVENTION

1. Field of the Invention

The present invention relates to hardware design. In particular, the invention relates to a re-configurable hardware design implemented in the integrated circuit (IC) of a wireless communication device.

2. Description of the Prior Art

Integrated circuits have improved so much that most signal processing is now performed in ICs rather than in discrete circuits. When an IC chip is mass produced in large quantities, the cost per individual IC chip is exceptionally low. Other advantages of modern ICs are their high element density and low power consumption. These advantages have led to a proliferation of small and relatively inexpensive wireless communication devices in the last decade.

Silicon transistors, both bipolar and complementary metal-oxide semiconductor (CMOS) types, are now so fast that radio frequency (RF) circuits in the lower GHz range can be provided in the IC of a wireless communication device. This has lead to significant improvements in the capabilities of modern wireless communication devices. Such devices include, but are not limited to, mobile phones, personal digital assistants, handheld computers, etc.

A familiar consideration in the design of IC chips is that they must have enough flexibility to be used in several different products and, in the case of wireless communication devices, to allow for future upgrades or evolutions in standards. Although software defined radio (SDR) design has been discussed much recently, software implementation of the complex algorithms necessary for communications typically requires a large amount of clock cycles of a digital signal processor (DSP). As a result, such designs cannot provide the higher performance necessary, for example, to support real-time multimedia services of third generation (3G) wireless communications systems. Various tradeoffs involved when writing software algorithms are discussed in the article entitled "Division and Square Root—Choosing the Right Implementation", by Peter Soderquist et al, IEEE Micro, pages 56–66, July/August 1997.

Conventional re-configurable hardware designs are known, typically consisting of either a field programmable gate array (FPGA) or an array of computing elements. Each design has unique advantages and disadvantages. For example, a FPGA has high programmability but typically has low calculation speed due to routing delays. An array of computing elements has high computational speed but usually a low degree of utilization due to the functional level of programmability.

A recent article entitled "CDSP: An Application Specific Digital Signal Processor for Third Generation Wireless Communications" by Po-Chih Tseng et al, IEEE 2001, describes a programmable digital signal processor (DSP) design proposed specifically for 3G wireless communications. See FIG. 1. Although the design has an architecture and instruction set specially designed for the Wideband Code Division Multiplex Access (WCDMA) radio interface of a communications system, it still suffers the latencies resulting from basic arithmetic operations like square root and division.

BRIEF SUMMARY

The preferred embodiment of the invention utilizes a unique hardware design to overcome the above-mentioned disadvantages. It is preferably implemented as a hardware accelerator for the DSP in an application specific integrated circuit (ASIC) of a wireless communication device.

The ASIC of the wireless communication in accordance with the preferred embodiment of the invention may contain a plurality of basic processing elements, which can be dynamically controlled to change the performed arithmetic operation. The preferred embodiment may thus allow the ASIC to meet different requirements pertaining to the use thereof such as increasing processing speed and minimizing power consumption in the device.

Preferably, the preferred embodiments is applied to data samples from the RF electronics of the wireless communication device. These data samples may be standardized channels detected, for example, by a RAKE receiver in a multi-user WCDMA communication device.

DETAILED DESCRIPTION OF THE PREFERRED EMBODIMENT OF THE INVENTION

Figure 1:
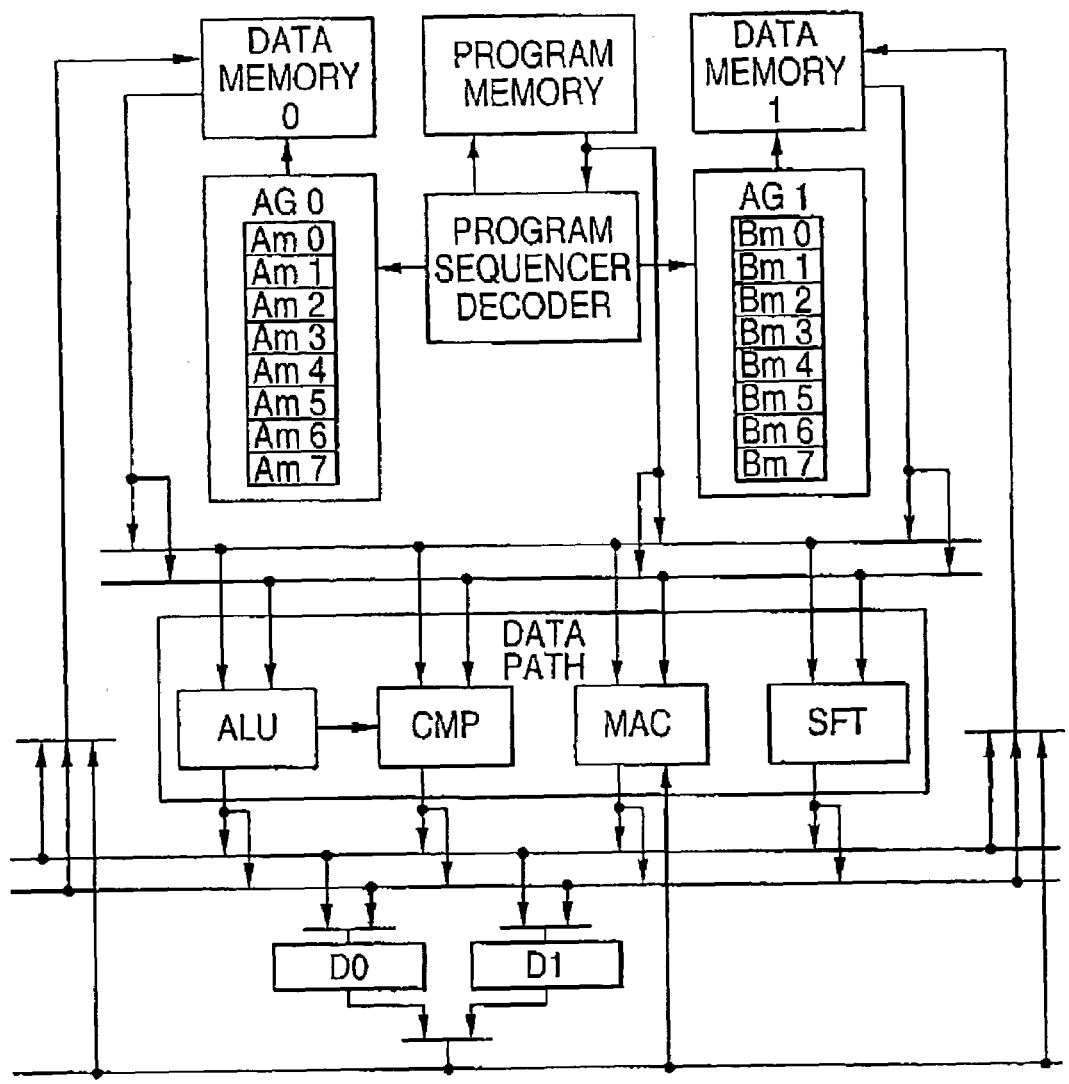
FIG. 1 illustrates the architecture of a prior art programmable digital signal processor for a wireless communications device.
Figure 2:
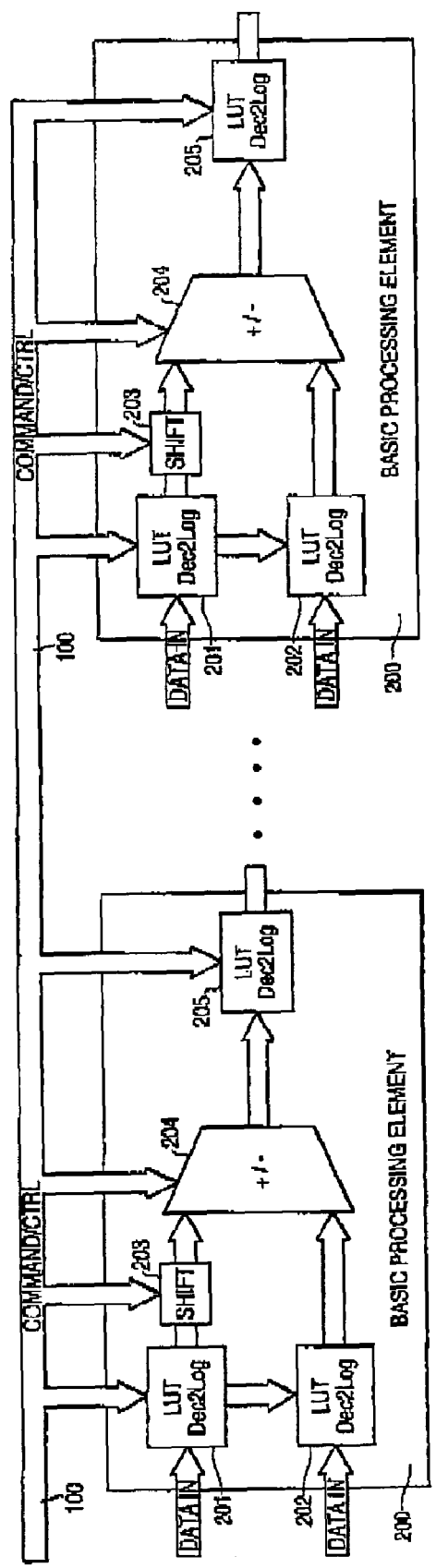
FIG. 2 is a block diagram of the structure of the basic processing element in a preferred embodiment of the present invention.

FIG. 2 is a block diagram of the structure of a basic processing element 200 used in a preferred embodiment of the invention. The basic processing element 200 consists of a first decimal scale to logarithmic scale (Dec2Log) look up table (LUT) 201; a second decimal scale to logarithmic scale (Dec2Log) look up table (LUT) 202, a shift circuit 203; an add/subtract element 204 and a logarithmic scale to decimal scale (Log2Dec) look up table (LUT) 205. Although the preferred embodiment illustrated in FIG. 2 and other embodiments are discussed hereafter as comprising look up tables, any one or more of the look up tables in the embodiments may be substituted with an element(s) that is capable of performing the function of converting from decimal scale to logarithmic scale or the function of converting from logarithmic scale to decimal scale but which is not a look up table.

Preferably, each look-up table 201, 202, and 205 is designed so that there is a unique one-to-one map between data in and data out without mathematical operations. Each one of elements 201–205 is selectively controlled by a command/control bus 100 so that a different mathematical operation is performed by processing element 200.

An addition operation is carried out by providing control signals via command/control bus 100 to bypass first decimal scale to logarithmic scale (Dec2Log) look up table (LUT) 201; second decimal scale to logarithmic scale (Dec2Log) look up table (LUT) 202; and logarithmic scale to decimal scale (Log2Dec) look up table (LUT) 205. A control signal to add/subtract element 204 causes it to work like a basic adder.

A multiplication operation is carried out by providing control signals so that the data in is transferred from decimal scale to logarithmic scale by Dec2Log LUT 202 and, as known, multiplication is carried out by the performing the add operation in log scale in add/subtract element 204. The resulting output from add/subtract element 204 is in logarithmic format and is converted back to decimal scale by Log2Dec LUT 205.

A division operation is carried out by providing control signals via command/control bus 100 so that data in is transferred from decimal scale to logarithmic scale by Dec2Log LUT 202 and, as known, division is carried out by the performing the subtraction operation in log scale in add/subtract element 204. The resulting output from add/subtract element 204 is in logarithmic format and is converted back to decimal scale by Log2Dec LUT 205.

A square root operation is carried out by providing control signals via command/control bus 100 so that data in is transferred from decimal scale to logarithmic scale by Dec2Log LUT 202 and the square root is carried out by performing a shifting operation in log scale in add/subtract element 204. The resulting output from add/subtract element 204 is in logarithmic format and is converted back to decimal scale by Log2Dec LUT 205.

A base 2 logarithmic operation is carried out by providing control signals via command/control bus 100 so that data in is transferred from decimal scale to logarithmic scale by Dec2Log LUT 202. Control signals are provided to bypass both add/subtract element 204 and Log2Dec LUT 205.

The ability to program the basic processing element to do a plurality of basic mathematic operations as described above provides a number of advantages. First, it reduces routing delay even when performing square root and division calculations. Second, it allows the hardware to be re-configurable and to have the flexibility to quickly process a variety of algorithms.

A key point is the accuracy and granularity of the look-up tables. The calculations are not performed with fixed point error inside basic processing element 200, but the logarithm values are presented as floating point numbers so as to guarantee as small as possible error for the area of numbers. The final number of bits depends on the bit number needed by the application. At the minimum, each decimal number has an unambiguous logarithmic value. The error is very small.

An error simulation for the output of the logarithmic table and the real logarithmic value shownss that the error is only in the range of thousandth parts and therefore meaningless as integer number values. According to preliminary simulations, the total error is about the sane size as at normal fixed point rounding errors. The output can also be presented as a floating point number, when the errors almost disappear. The benefit compared to "normal calculation" is that the method is faster.

In a multi-user WCDMA communication device, Cholseky factorization is required for the complex first and second sequences for noise-whitening. In an Enhanced Data Rates for GSM Evolution (EDGE) communication device, Cholesky factorization is used to calculate pre-filtering. Cholesky factorization is very complex. See, for example, the Annex to "Transmit Diversity schemes for Broadcast channels of the TDD mode", 3GPP, TSGR1#7(99) c08, 30 Aug.—3 Sep. 1999, Motorola. An example of the Matlab-code for Cholesky factorization is as follows:

for j=1n,
if j>1;
A(j:n,j)=A(j:n,j)−A(j:n,1:j−1)*A(j,1:j−1)';
end;
a(j:n,j)=A(j:n,j)/sqrt(a(j,j));

As can be seen from the Matlab code, the Cholesky factorization requires a square root operation. With the preferred embodiment of the invention described above with respect to FIG. 2, this square root operation can be done within a reasonable number of clock cycles. Also, the line in paragraph 27 can be operated within the same clock cycle so that a square root operation is programmed for one input data and the add/subtract processing element is programmed to carry out a subtract operation.

The preferred embodiment may be implemented in a multi-user communication device in a WCDMA communications system. As known, such a device also contains RF electronics, which provide receiving and transmitting functions, such as first and second complex sequences, from spatially diverse antennas and outputs an analog output signal which is applied to an A to D converter (not shown). The resultant digitized data samples represent samples of the orthogonal I and Q components of each symbol. The demodulated first and second complex sequences outputted by the A to D converter are applied to a matched filter and to a RAKE receiver. The output of the RAKE receiver is coupled to a decoder. The decoder outputs decoded data received on standardized channels. The I and Q components of the symbols which are outputted from the A to D converter are applied to the matched filter which typically has a number of actual stages equal to the number of chips per bit.

A sample storage may store data samples produced by A to D converter, which may be read out and detected by an ASIC including a plurality of basic processing elements as described above. A first sequence generator generates a complex conjugate of the first complex sequence transmitted by one of the antennas and a second sequence generator generates a complex conjugate of the second complex sequence transmitted by the other of the antennas. Of course, the preferred embodiment need not be applied to a wireless communication device in a system with multiple antennas. The detected outputs of the first and second sequence generators are complex, are respectively applied to first and second multipliers, which respectively multiply the demodulated first and second sequences outputted by the matched filter, to produce detected complex first and second sequences.

While the invention has been described in terms of its preferred embodiments, it should be understood that numerous modifications may be made thereto without departing from the spirit and scope of the invention. It is intended that all such modifications fall within the scope of the appended claims.

The invention claimed is:

1. An integrated circuit, comprising:
a command/control bus;
a plurality of processing elements containing a number of parts, each part being connected to said command/control bus, each of said plurality of processing elements being re-configurable in response to commands on said command/control bus to provide any one of a plurality of different arithmetic operations,
wherein at least one of said number of parts in said processing element being configurable to operate in logarithmic scale.

2. An integrated circuit according to claim 1, wherein said number of parts comprise at least element that is capable of performing the function of converting from decimal scale to logarithmic scale.

3. An integrated circuit according to claim 2, further comprising a plurality of decimal scale to logarithmic scale look up tables, each decimal scale to logarithmic scale look up table having an input connected to a respective data in path and an output connected to a respective input of a add/subtract element.

4. An integrated circuit according to claim 3, wherein an output of said add/subtract element is connected to an input of said logarithmic scale to decimal scale look up table.

5. An integrated circuit according to claim 4, wherein each of said processing elements is re-configurable to perform any one of the arithmetic operations of addition, multiplication, division, and square root.

6. An integrated circuit according to claim 5, wherein each of said plurality of processing elements can be configured to perform the addition operation by bypassing the decimal scale to logarithmic scale look up tables and controlling the add/subtract element to operate as a basic adder.

7. An integrated circuit according to claim 6, wherein each of said plurality of processing elements can be configured to perform the multiplication operation by transferring data from decimal scale to logarithmic scale in the scale to logarithmic scale look up table; controlling the add/subtract element to operate as an adder; and transferring the output of the add/subtract element from logarithmic scale to scale in the logarithmic scale to scale look up table.

8. An integrated circuit according to claim 7, wherein each of said processing elements can be configured to perform the division operation by transferring data from decimal scale to logarithmic scale in the logarithmic scale to decimal scale look up tables; controlling the add/subtract element to carry out a subtraction operation; and transferring the output of the add/subtract element from logarithmic scale to decimal scale in the logarithmic scale to decimal scale look up table.

9. An integrated circuit according to claim 8, wherein each of said processing elements can be configured to perform the square root operation by transferring data from decimal scale to logarithmic scale in the logarithmic scale to decimal scale look up tables; controlling the add/subtract element to carry out a shifting operation; and transferring the output of the add/subtract element from logarithmic scale to decimal scale in the logarithmic scale to decimal scale look up table.

10. An integrated circuit according to claim 1, wherein said number of parts comprise at least one add/subtract element.

11. An integrated circuit according to claim 1, wherein said number of parts include a logarithmic scale to decimal scale look up table.

12. A wireless communication device, comprising:
a radio frequency circuit receiving and transmitting communication signals; and
an integrated circuit arranged to receive communication signals from said radio frequency circuit and including:
a command/control bus;
a plurality of processing elements receiving containing a number of parts, each part being connected to said command/control bus, each of said plurality of processing elements being re-configurable in response to commands on said command/control bus to provide any one of a plurality of different arithmetic operations,
wherein at least one of said number of parts in said processing element being configurable to operate in logarithmic scale.

13. A wireless communication device according to claim 12, wherein said number of parts comprise at least one decimal scale to logarithmic scale look up table.

14. A wireless communication device according to claim 13, further comprising a plurality of decimal scale to logarithmic scale look up tables, each decimal scale to logarithmic scale look up table having an input connected to a respective data in path and an output connected to a respective input of a add/subtract element.

15. A wireless communication device according to claim 14, wherein an output of said add/subtract element is connected to an input of said logarithmic scale to decimal scale look up table.

16. A wireless communication device according to claim 15, wherein each of said processing elements is re-configurable to perform any one of the arithmetic operations of addition, multiplication, division, and square root.

17. A wireless communication device according to claim 16, wherein each of said plurality of processing elements can be configured to perform the addition operation by bypassing the decimal scale to logarithmic scale look up tables and controlling the add/subtract element to operate as a basic adder.

18. A wireless communication device according to claim 17, wherein each of said plurality of processing elements can be configured to perform the multiplication operation by transferring data from decimal scale to logarithmic scale in the decimal scale to logarithmic scale look up table; controlling the add/subtract element to operate as an adder; and transferring the output of the add/subtract element from logarithmic scale to decimal scale in the logarithmic scale to decimal scale look up table.

19. A wireless communication device according to claim 18, wherein each of said processing elements can be configured to perform the division operation by transferring data from decimal scale to logarithmic scale in the logarithmic scale to decimal scale look up tables; controlling the add/subtract element to carry out a subtraction operation; and transferring the output of the add/subtract element from logarithmic scale to decimal scale in the logarithmic scale to decimal scale look up table.

20. A wireless communication device according to claim 19, wherein each of said processing elements can be configured to perform the square root operation by transferring data from decimal scale to logarithmic scale in the logarithmic scale to decimal scale look up tables; controlling the add/subtract element to carry out a shifting operation; and transferring the output of the add/subtract element from logarithmic scale to decimal scale in the logarithmic scale to decimal scale look up table.

21. A wireless communication device according to claim 12, wherein said number of parts comprise at least one add/subtract element.

22. A wireless communication device according to claim 12, wherein said number of parts include a logarithmic scale to decimal scale look up table.

* * * * *